UNITED STATES PATENT OFFICE 1,930,876

NITROGEN CONTAINING COMPOUNDS AND PROCESS OF PREPARING THEM

Heinrich Greune and Wilhelm Eckert, Frankfort-on-the-Main-Hochst, Germany, assignors to General Aniline Works, Inc., New York, N. Y., a corporation of Delaware No Drawing. Application October 6, 1930, Serial No. 486,859, and in Germany October 17, 1929

15 Claims. (Cl. 260—127)

The present invention relates to nitrogen containing compounds and to a process of preparing them.

We have found that nitrogen containing compounds, are obtainable by condensing compounds of the following general formula

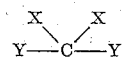

wherein X stands for hydrogen or alkyl or the two X's stand for an organic bivalent substituent, as, for instance, a benzal or naphthal group, and Y stands for a substituent of the group consisting of CN and CONH$_2$ such, for instance, as malonic acid dinitrile, cyanacetamide, malonic acid diamide or other compounds which can easily be transformed into dicarboxylic acid dinitriles of the type of the malonic acid nitrile, by means of a metal chloride having a condensing action, either alone or in the presence of a solvent or a diluent, with aromatic hydrocarbons or the derivatives or substitution products thereof, such as toluene, naphthalene, acenaphthene, 1-methylnaphthalene, anthracene or alpha- or beta-naphthol ether. As metal chlorides having a condensing action there may be used, for instance, aluminium chloride, zinc chloride, iron chloride or the like, and as diluents either inorganic salts such, for instance, as sodium chloride, potassium chloride, sodium fluoride, or indifferent organic solvents as, for instance, chlorobenzene, trichlorobenzene or the like. The reaction temperature can vary from room temperature up to about 300° C., for instance to, the boiling point of the organic solvent used in the process.

The reaction takes place in such a way that the dicarboxylic acid dinitrile first reacts, probably with primary formation of an imidechloride, upon the hydrocarbon with formation of a ketimide of an ω-cyanacetyl compound, in a manner similar to Friedel-Crafts' reaction. If the said ketimide is an α-derivative and its adjacent peri-position unoccupied, the reaction proceeds with formation of a 6 membered-ring and there is obtained a diketimide of a peri-indandion. By using, for instance, acenaphthene as the hydrocarbon, the reaction takes the following course:

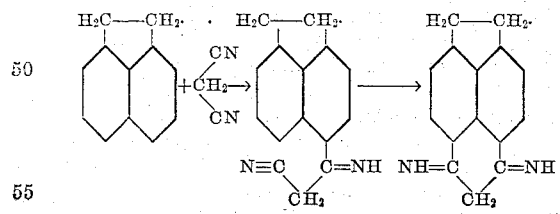

If, however, the primarily formed ketimide is a β-derivative or if it is a ketimide obtained from a mononuclear hydrocarbon as, for instance, toluene, there is no possibility for the formation of a 6 membered-ring; no further reaction takes place and when working up the melt there is obtained with saponification of the ketimide a ω-cyanacetyl compound. When using toluene, for instance, the new reaction takes the following course:

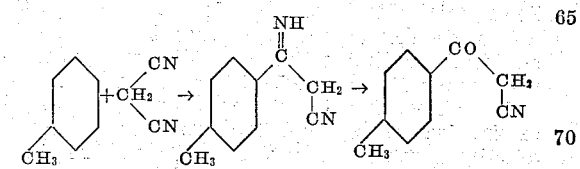

The new products obtainable according to the present process partly correspond with the following formula

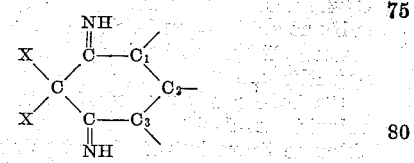

wherein X stands for hydrogen or alkyl or the two X's together stand for an organic bivalent substituent and $C_1$, $C_2$ and $C_3$ are members of a polynuclear aromatic grouping, $C_1$ and $C_3$ representing carbon atoms occupying the peri-positions of said grouping. In most cases they are obtained in the form of a salt, for instance, as hydrochloride, from which the free base may be obtained by means of alkali.

The diketimides of peri-indandions thus obtainable are in general yellow to red compounds. They dissolve in solvents with a strong fluorescence. The ω-cyanacetyl compounds are generally colorless to feebly yellow, well crystallizing products which dissolve in organic solvents or concentrated sulfuric acid without fluorescence. Both types, the diketimides of the peri-indandions as well as the ω-cyanacetyl compounds are valuble starting materials for the manufacture of dyestuffs.

The following examples illustrate the invention, but they are not intended to limit it thereto, the parts being by weight:

(1) Into a mixture consisting of 264 parts of aluminium chloride and 58 parts of anhydrous sodium chloride there is added, at about 120° C., a mixture of 30 parts of acenaphthene and 15,8 parts of malonic acid dinitrile and the whole is stirred at this temperature for about 20 minutes.

The melt is then decomposed by means of ice and water and filtered with suction. The yellow mass remaining on the filter is dissolved in warm water, wherein the greatest part of the said mass dissolves. The solution thus obtained is filtered from the small quantity of undissolved product and a concentrated solution of sodium chloride is added to the filtrate, whereby the new nitrogen containing compound separates with a good yield in the form of a yellow body. It probably constitutes the hydrochloride of the di-ketimide of the peri-acenaphthindandion. It easily dissolves in warm water with a yellow coloration. The hydrochloride is almost completely precipitated from the aqueous solution by means of a solution of sodium chloride; whereas by addition of alkali the free di-ketimide which probably corresponds with the following formula:

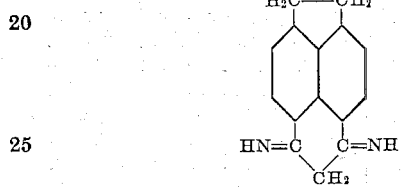

separates in the form of a yellow precipitate. In organic solvents, such as alcohol, glacial acetic acid or the like as well as in concentrated sulfuric acid the di-ketimide dissolves with a yellow coloration and an intense yellowish-green fluorescence.

The above mentioned water-insoluble residue of the decomposed melt is extracted with dilute alkali, the solution is filtered and from the alkaline filtrate there is precipitated by means of acid a feebly yellow compound which crystallizes from organic solvents in fine needles melting at 210° C.–211° C. and which dissolves in concentrated sulfuric acid to a red solution showing no fluorescence. It probably is the 3-ω-cyanacetyl-acenaphthene.

(2) Into a mixture of 132 parts of aluminium chloride and 29 parts of anhydrous sodium chloride there is introduced at about 140° C. an intimate mixture of 12.8 parts of naphthalene and 13.2 parts of malonic acid dinitrile and the whole is stirred for some time at this temperature. The melt is then decomposed with ice and water and filtered with suction. The residue is boiled with water, filtered with suction while hot and to the filtrate there is added a concentrated solution of sodium chloride, whereby the nitrogen containing compound of the following probable formula

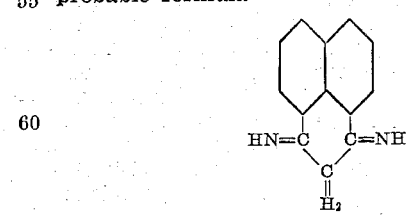

separates as the hydrochloride in the form of a yellow body. It may be recrystallized from a dilute solution of sodium chloride; it melts at above 300° C., dissolves in concentrated sulfuric acid with an intense fluorescence and probably represents the hydrochloride of the di-ketimide of the peri-naphthindandion.

(3) An intimate mixture consisting of 132 parts of aluminium chloride, 15.4 parts of acenaphthene and 15 parts of cyanacetamide is slowly heated to 90° C., the temperature is then raised and maintained at 140–150° C. for some time. When working up the melt as indicated in Example 1, a nitrogen containing compound is obtained, which is identical with the compound obtainable according to Example 1.

(4) Into a suspension of 100 parts of aluminium chloride in 200 parts of dry trichlorobenzene there is introduced at 80° C. a mixture of 17.8 parts of anthracene and 10 parts of methyl malonic acid dinitrile and the whole is heated for some time to 120°–140° C. The mass is then decomposed with water, the trichlorobenzene is expelled by means of steam, the remaining mass is filtered with suction and extracted with hot water, whereby the di-ketimide of the 1.9-anthracenemethylindandione of the following probable formula

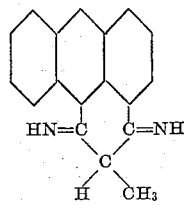

which has been obtained with a good yield in the form of the hydrochloride dissolves with a red coloration. The said di-ketimide can easily be precipitated by means of sodium chloride in the form of the hydrochloride as a red colored compound. In concentrated sulfuric acid it dissolves with a blood-red coloration and an intense yellowish-red fluorescence. When oxidizing in an acid medium with bichromate, the known anthracene-1.9-di-carboxylic acid is obtained.

(5) To a molten mixture consisting of 510 parts of aluminium chloride, 60 parts of sodium chloride, 42 parts of potassium chloride and 18 parts of sodium fluoride there is added at 80° C–100° C. a mixture of 92 parts of alpha-methyl-naphthalene and 47 parts of malonic acid dinitrile and the whole is stirred at this temperature for a short time. The melt is then decomposed with ice and water, filtered with suction and the solid matter is extracted with warm water, whereby the product which has been formed with a good yield as the hydrochloride and which probably is the di-ketimide of the alpha-methyl-naphthalene of the following formula

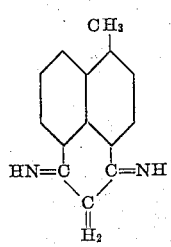

dissolves to a yellow solution. It can be precipitated from this solution in the form of a yellow compound by addition of sodium chloride. In concentrated sulfuric acid it dissolves with a yellow coloration and an intense yellowish-green fluorescence. When oxidizing it in an acid medium with bichromate the known 1.4.5-naphthalenetricarboxylic acid is obtained.

(6) To a molten mixture of 660 parts of aluminium chloride and 142 parts of anhydrous sodium chloride there is added at 110° C.–120° C. an intimate mixture of 95 parts of beta-naphtholmethyl-ether and 47 parts of malonic acid dinitrile and the whole is stirred at about 120° C. for about 15 minutes. The melt is then decomposed with ice and water and filtered with suction. The solid matter is extracted with warm water and filtered. The filtrate is allowed to cool and a solution of sodium chloride is added thereto, whereby probably the di-ketimide of the 2-methoxy-1.8-naphthindandion of the following formula

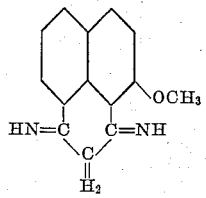

is precipitated in a satisfactory yield as hydrochloride in the form of a yellow product. In concentrated sulfuric acid it dissolves with an intense fluorescence.

By using instead of the beta-naphtholmethylether the alpha-naphtholmethylether and working under the same conditions, the corresponding di-ketimide of the 1-methoxy-4.5-naphthindandion is obtained with a similar yield. This product has properties similar to those of the isomeric 2-methoxy-1.8-naphthindandion.

(7) Into a suspension of 440 parts of finely powdered aluminium chloride and 300 parts of chlorobenzene there are introduced simultaneously, while stirring at room temperature, 50 parts of methyl malonic acid dinitrile and 92.4 parts of acenaphthene. The temperature thereby rises to 30° C.–35° C. while the melt turns green. In order to complete the transformation stirring is continued at this temperature for a prolonged time or advantageously the temperature is slowly raised to 80° C.–110° C. or, for a short time, to the boiling point. As soon as the green mixture has assumed a yellowish coloration, it is decomposed either directly with water or the chlorobenzene is distilled off in vacuo after previous addition of 90 parts of anhydrous sodium chloride. When working up the decomposed melt as indicated in Example 1, the methyl homologue of the peri-acenaphthindandion of the following formula

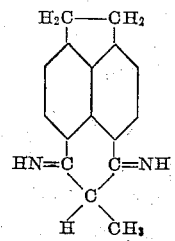

is obtained in the form of the hydrochloride. Its properties are similar to those of the di-ketimide obtainable according to Example 1. It has a yellow color and dissolves in concentrated sulfuric acid with a yellow coloration and an intense yellowish-green fluorescence. It dissolves easily in warm water and may be reprecipitated completely by addition of sodium chloride.

(8) Into a suspension of 300 parts of toluene and 250 parts of aluminium chloride there are introduced at room temperature 35 parts of malonic acid dinitrile and the whole is slowly heated to about 80° C. and stirred at this temperature for about 1 hour. The melt is then allowed to cool; is decomposed with ice and water and the toluene is eliminated by means of steam. The solid matter is recrystallized from alcohol or water; it represents a product of the following probable formula

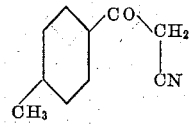

and crystallizes in colorless needles; it melts at 109° C. and dissolves in concentrated sulfuric acid to a colorless solution.

Other mononuclear hydrocarbons such, for instance, as benzene, xylene behave in a manner analogous to that of toluene. The same reaction may also be carried out by means of mononuclear phenols and phenol ethers.

We claim:

1. The process which comprises causing a compound of the following formula

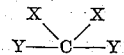

wherein X stands for hydrogen or alkyl or the two X's stand together for an organic bivalent substituent and Y stands for a substituent of the group consisting of CN, CONH$_2$ to act upon a compound of the group consisting of benzene, naphthalene; anthracene- and acenaphthene compounds in the presence of a metal chloride having a condensing action.

2. The process which comprises causing a compound of the following formula

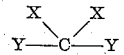

wherein X stands for hydrogen or alkyl or the two X's stand together for an organic bivalent substituent and Y stands for a substituent of the group consisting of CN, CONH$_2$ to act upon a compound of the group consisting of benzene, naphthalene; anthracene- and acenaphthene compounds in the presence of a metal chloride having a condensing action and an inert diluent.

3. The process which comprises causing a compound of the following formula

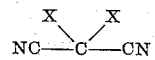

wherein X stands for hydrogen or alkyl to act upon a compound of the group consisting of benzene, naphthalene; anthracene- and acenaphthene compounds in the presence of a metal chloride having a condensing action and an inert diluent.

4. The process which comprises causing a compound of the following formula

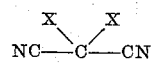

wherein X stands for hydrogen or methyl to act upon a compound of the group consisting of benzene, naphthalene; anthracene- and acenaphthene compounds in the presence of a metal chloride having a condensing action and an inert diluent.

5. The process which comprises causing a compound of the following formula

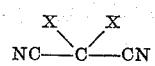

wherein X stands for hydrogen or methyl to act upon an aromatic compound of the following formula

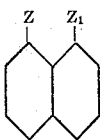

wherein Z stands for hydrogen, $Z_1$ stands for hydrogen, methyl or methoxy or Z and $Z_1$ stand together for a —$CH_2$—$CH_2$— bridge in the presence of aluminium chloride and an inert diluent.

6. The process which comprises causing a compound of the following formula

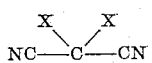

wherein X stands for hydrogen or methyl to act upon acenaphthene in the presence of aluminium chloride and an inert diluent.

7. The process which comprises causing malonic acid dinitrile to act at about 120° C. upon acenaphthene in the presence of aluminium chloride and sodium chloride.

8. The process which comprises causing malonic acid dinitrile to act at about 120° C. to about 140° C. upon anthracene in the presence of aluminium chloride and dry trichlorobenzene.

9. As new products, compounds of the following general formula

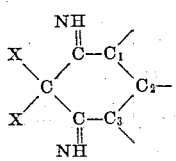

wherein X stands for hydrogen or alkyl or the two X's stand together for an organic bivalent substituent and $C_1$, $C_2$, $C_3$ are members of an aromatic grouping of the group consisting of naphthalene, anthracene and acenaphthene radicals, $C_1$ and $C_3$ representing carbon atoms occupying the peri-positions of said grouping.

10. As new products compounds of the following general formula

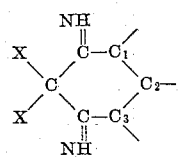

wherein X stands for hydrogen or alkyl and $C_1$, $C_2$, $C_3$ are members of an aromatic grouping of the group consisting of naphthalene, anthracene and acenaphthene radicals, $C_1$ and $C_3$ representing carbon atoms occupying the peri positions of said grouping.

11. As new products, compounds of the following general formula

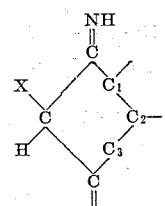

wherein X stands for hydrogen or methyl and $C_1$, $C_2$ and $C_3$ are members of an aromatic grouping of the group consisting of naphthalene, anthracene and acenaphthene radicals, $C_1$ and $C_3$ representing carbon atoms occupying the peri positions of said grouping.

12. As new products, compounds of the following general formula

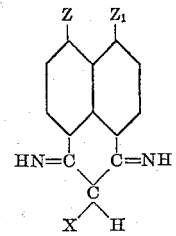

wherein X stands for hydrogen or methyl, Z for hydrogen, $Z_1$ for hydrogen, methyl or methoxy or Z and $Z_1$ together stand for a —$CH_2$—$CH_2$— bridge.

13. As new products, compounds of the following general formula

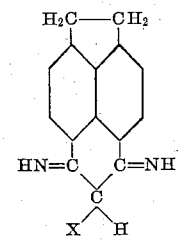

wherein X stands for hydrogen or methyl, forming with hydrochloric acid a hydrochloride which dissolves in organic diluents as well as in concentrated sulfuric acid to a yellow solution having a strong yellowish-green fluorescence.

14. As a new product, the compound of the following formula

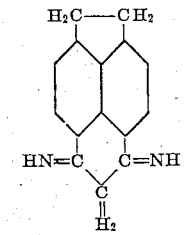

being a yellow product forming a hydrochloride which dissolves in organic diluents as well as in concentrated sulfuric acid to a yellow solution having a strong yellowish-green fluorescence.

15. As a new product, the compound of the following formula

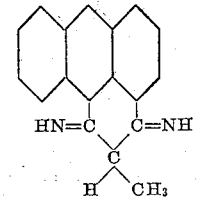

being in the form of its hydrochloride a reddish substance, which dissolves in concentrated sulfuric acid to a blood-red solution having a strong yellowish-red fluorescence and yielding on oxidation the anthracene-1.9-dicarboxylic acid.

HEINRICH GREUNE.
WILHELM ECKERT.